United States Patent
Wang et al.

(10) Patent No.: US 12,397,384 B2
(45) Date of Patent: Aug. 26, 2025

(54) HOLE MAKING TOOL FOR ARAMID FIBER-REINFORCED PLASTIC AND DESIGN METHOD THEREOF

(71) Applicant: DALIAN UNIVERSITY OF TECHNOLOGY, Liaoning (CN)

(72) Inventors: Fuji Wang, Liaoning (CN); Hongwei Zhao, Liaoning (CN); Rao Fu, Liaoning (CN); Meng Zhao, Liaoning (CN); Dekun Yin, Liaoning (CN); Zhenyuan Jia, Liaoning (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 236 days.

(21) Appl. No.: 18/350,921

(22) Filed: Jul. 12, 2023

(65) Prior Publication Data

US 2024/0024993 A1 Jan. 25, 2024

(30) Foreign Application Priority Data

Jul. 15, 2022 (CN) .......................... 202210836428.4

(51) Int. Cl.
*B23P 15/32* (2006.01)
*B23P 15/46* (2006.01)

(52) U.S. Cl.
CPC .............. *B23P 15/32* (2013.01); *B23P 15/46* (2013.01)

(58) Field of Classification Search
CPC ................................. B23P 15/32; B23P 15/46
See application file for complete search history.

(56) References Cited

U.S. PATENT DOCUMENTS

| 12,226,861 | B1* | 2/2025 | Bonner | B21K 5/04 |
| 2012/0301239 | A1* | 11/2012 | Prom | B23B 51/02 |
| | | | | 408/226 |
| 2013/0101362 | A1* | 4/2013 | Dyer | B23P 15/32 |
| | | | | 156/60 |
| 2014/0301798 | A1* | 10/2014 | Koike | B23P 15/32 |
| | | | | 408/229 |
| 2022/0184716 | A1 | 6/2022 | Vermorel et al. | |
| 2022/0241875 | A1* | 8/2022 | Pecat | B23C 5/16 |

FOREIGN PATENT DOCUMENTS

| CN | 202070799 U | 12/2011 |
| CN | 105034076 A | 11/2015 |
| CN | 105499665 A | 4/2016 |

(Continued)

*Primary Examiner* — Omar Flores Sanchez
(74) *Attorney, Agent, or Firm* — Muncy, Geissler, Olds & Lowe, P.C.

(57) ABSTRACT

The present invention belongs to the technical field of composite material processing, and relates to a hole making tool for aramid fiber-reinforced plastic and a design method thereof. The drill bit has a step reversed point angle structure, which can reduce a trust force during drilling and effectively cut off a high toughness aramid fiber, thus to improve the hole making quality of an AFRP-related component. It is proved that the new tool can significantly improve the hole making quality of an AFRP component, improve the service life and safety degree, and greatly reduce the processing cost. Therefore, the present invention has a broad application prospect in the fields of aerospace, military industries and civil application.

1 Claim, 4 Drawing Sheets

(56) References Cited

FOREIGN PATENT DOCUMENTS

| | | |
|---|---|---|
| CN | 106624080 A | 5/2017 |
| CN | 108608040 A | 10/2018 |
| CN | 210996695 U | 7/2020 |
| CN | 113523365 A | 10/2021 |
| DE | 10 2016 221 363 A1 | 3/2018 |
| DE | 2020 16 008 969 U1 | 2/2021 |
| EP | 3 771 512 A1 | 2/2021 |
| JP | 2017-202541 A | 11/2017 |

* cited by examiner

HOLE MAKING TOOL FOR ARAMID FIBER-REINFORCED PLASTIC AND DESIGN METHOD THEREOF

TECHNICAL FIELD

The present invention belongs to the technical field of composite material processing, and relates to a hole making tool for aramid fiber-reinforced plastic and a design method thereof.

BACKGROUND

Aramid fiber-reinforced plastic (hereinafter referred to as AFRP) has the advantages of light weight, high strength and impact resistance, and has become a preferred material for high-end equipment in the fields aerospace and military armor. A large number of AFRP parts and components are used in the radome of F22 fighter of the United States and the fuselage of AH-124 transport aircraft of the Former Soviet Union. Such parts and components need a lot of connection and assembly in the application process, and are mostly processed by drilling holes. In the process of AFRP drilling, as AFRP has obvious stacked characteristic and anisotropic characteristic, a traditional metal cutting tool is difficult to apply. At the same time, as the interlayer bonding force of AFRP is only about two-thirds of that of carbon fiber reinforced plastic (hereinafter referred to as CFRP), the fiber and resin/interface are more easily to debond and cause a delamination damage. In addition, as the toughness of an aramid fiber is more than three times of that of a carbon fiber, the failure behavior of the aramid fiber is different from the complete brittle fracture of the carbon fiber, resulting in that a special tool for other composite materials such as CFRP is not suitable for AFRP. Therefore, at present, damages such as delamination and burrs are easy to occur at an outlet in the drilling process of AFRP, which will result in a significant reduction in the bearing capacity and service life of a processed part, and even lead to a safety accident.

In order to solve the above problems, researchers at home and abroad have carried out relevant studies. Cheng Yong, et al. of Bluedrill Technology (Shenzhen) Co., Ltd. have applied "an aramid drill bit" with a patent application number of CN202110988979.8, which is provided with an outer cutting edge on one end of a drill pipe to improve the hole making quality of AFRP. However, the trust force of the bit is large in the drilling process, especially in the process of large hole drilling, which is easy to cause delamination at the outlet. Wang Fuji, et al. of Dalian University of Technology have disclosed "a stepped sawtooth tool with a vertical edge for preparing high-quality holes of composite material and laminated structure thereof" with a patent number of ZL201810466351.X. The tool can effectively inhibit the processing damage of a CFRP/aluminum alloy laminated structure, but is difficult to control the processing damage of AFRP. Therefore, a special tool that can realize high quality AFRP processing is still in lack at present. At the same time, the determination of the structural parameters of an existing hole making tool requires a large number of experimental tests and repeated corrections, and aramid fibers are various in kinds, so that the human, financial and material resources spent on tool design by experimental trial production are extremely surprising.

SUMMARY

In view of the technical problems that damages such as delamination and burrs are easy to occur when an aramid fiber composite material is drilled to make a hole, the present invention proposes a hole making tool for aramid fiber composite material and a design method thereof, which can realize the fast design of a high quality drilling tool for AFRP. The drill bit has a step reversed point angle structure, which can reduce a trust force during drilling and effectively cut off a high toughness aramid fiber, thus to improve the hole making quality of an AFRP-related component. With the step reversed point angle structure, the axial compression on an outlet surface fiber is converted into axial tension, which reduces the deformation degree of the outlet surface fiber under the action of the tool, and effectively cuts off the outlet surface fiber. At the same time, the present invention also proposes an optimal design method taking into account the step diameter ratio and point angles of the tool. The step diameter ratio can be primarily selected to obtain an optimal range of each point angle by calculation according to the parameters such as material properties and cutting conditions, thus to greatly improve the efficiency of tool design.

The technical solution of the present invention is as follows:

A hole making tool for aramid fiber-reinforced plastic, comprising four regions: a multiple point angle drill tip region A, a reversed point angle reaming region B, a reaming region C and a shank clamping region D;

The multiple point angle drill tip region A has a drilling type which is the same as that of a twist drill, and has a tool diameter of $D_1$; the width of a chisel edge 1 is $b_1$, a major cutting edge is divided into a major cutting edge first part 2 and a major cutting edge second part 3 to form a double point angle structure which comprises a major cutting edge first point angle $N_1$ and a major cutting edge second point angle $N_2$, corresponding radial widths are respectively a first part radial length $b_2$ of the major cutting edge second part 3 and a second part radial length $b_3$ of the major cutting edge second part 3, and a width ratio is determined according to actual processing requirements; a rake face 10 and a flank face 12 of the tool are ground to form a major cutting edge rake angle $\gamma_1$ and two major cutting edge relief angles which are respectively a major cutting edge primary relief angle $\alpha_1$ and a major cutting edge secondary relief angle $\alpha_2$;

The reversed point angle reaming region B comprises a reversed point angle structure E, a second step part of the tool is ground to obtain a second step reversed point angle which is P, a drill margin width is $b_4$, a drill margin depth is $b_5$, the maximum length of the reversed point angle structure is $b_6$, a major cutting edge rake angle of the reversed point angle structure is $\gamma_2$, and a major cutting edge relief angle of the reversed point angle structure is $\alpha_3$. As a first step diameter and a second step diameter are different, a helix angle $N_3$ of a chip groove and the width $b_7$ of the chip groove in the two steps shall be appropriate to meet the requirements of discharging chips smoothly, not causing chip blocking, and ensuring the rigidity of the structure in each step of the tool.

The tool diameter of the reaming region C is the second step diameter $D_2$, the reaming region C has a drill margin 7 and a taper of 3:1000, and the diameter near a minor cutting edge is large, so that the drilled and reamed holes can be further processed to improve the hole making quality.

The diameter of the shank clamping region D is a shank diameter $D_3$, and a clamping length is determined according to actual clamping requirements.

In view of the problems that the trust force has a great influence on delamination damage when AFRP is drilled, and the performance difference of different grades of aramid fibers is obvious, and a tool with a fixed point angle has poor versatility when used for cutting aramid fibers, the present invention further proposes an optimal design method for the step diameter ratio and point angles of the tool.

First, the attribute parameters of a material to be processed, including an AFRP bonding interface equivalent modulus $k_b$, a bonding strength $\sigma_b$, an elastic modulus $E_f$ of a lower surface material, a moment of inertia of the section $I_f$ of the lower surface material, a single-layer fiber thickness t, a feed per tooth v, an end hole design diameter $D_2$, the step diameter ratio n, a bottom layer debonding fiber length L, a half point angle $\varphi$ of the tool, and a fiber deflection change z are determined. Specific steps of the design method are as follows:

Step 1: inputting the single-layer fiber thickness t and the feed per tooth v to obtain the relationship of a radial component force $F_X$ and an axial component force $F_Z$ with the half point angle $\varphi$ of the tool by calculation;

Step 2: inputting the bonding interface equivalent modulus $k_b$, the bonding strength limit $\sigma_b$, the elastic modulus $E_f$ and the moment of inertia of the section $I_f$ according to the criteria for judging fiber material debonding to obtain a fiber deflection deformation equation by calculation:

$$z = e^{-\sqrt[4]{k_b/4E_fI_f}\,x}\left(K_1\cos\sqrt[4]{k_b/4E_fI_f}\,x + K_2\sin\sqrt[4]{k_b/4E_fI_f}\,x\right) + \\ e^{\sqrt[4]{k_b/4E_fI_f}\,x}\left(K_3\cos\sqrt[4]{k_b/4E_fI_f}\,x + K_4\sin\sqrt[4]{k_b/4E_fI_f}\,x\right) \quad (1)$$

where $K_i$ (i=1, 2, 3, 4) is an integral constant;

Step 3: inputting the end hole design diameter $D_2$ and primarily selecting the step diameter ratio n to obtain an expression of the bottom layer debonding fiber length L by calculation:

$$L = (n-1)D_2/2n \quad (2)$$

Step 4: substituting the expression of the radial component force $F_X$ and the axial component force $F_Z$ about the half point angle $\varphi$ of the tool and the expression of the debonding fiber length L into the debonding fiber deflection equation to obtain an equation of the half point angle $\varphi$ and the deflection z:

$$z = \left(e^{-\sqrt{\frac{t\cdot v\cdot\sin\varphi}{E_fI_f}}\cdot(n-1)D_2/2n} - e^{\sqrt{\frac{t\cdot v\cdot\sin\varphi}{E_fI_f}}\cdot(n-1)D_2/2n} - (n-1)/n\cdot D_2\right)\tan\varphi \quad (3)$$

Step 5: determining the deflection change range of the material according to processing quality requirements, calculating the corresponding ranges of the point angles according to equation (3) to guide the design of the tool, and judging and checking whether the structure of the tool is reasonable; if reasonable, the tool developed based on the above method can reduce the trust force when AFRP is drilled, convert the axial compression effect of the tool on the material into the axial tension effect, effectively remove aramid fibers, and then reduce the damages such as delamination and burrs during processing; if not reasonable, going back to step 3 and selecting the step diameter ratio n again.

The present invention has the following beneficial effects: the present invention proposes a hole making tool for aramid fiber composite material and a design method thereof. The drill bit has a step reversed point angle structure, which can reduce a trust force during drilling and effectively cut off a high toughness aramid fiber, thus to improve the hole making quality of an AFRP-related component. Through the combination and optimization of the above structures, the present invention also summarizes and proposes a rapid design method of the hole making tool for aramid fiber composite material by drilling. It is proved that the new tool can significantly improve the hole making quality of an AFRP component, improve the service life and safety degree, and greatly reduce the processing cost. Therefore, the present invention has a broad application prospect in the fields of aerospace, military industries and civil application.

In the figures: A—multiple point angle drill tip region, B—reversed point angle reaming region, C—reaming region, D—shank clamping shank region, and E—reversed point angle structure; 1—chisel edge, 2—major cutting edge first part, 3—major cutting edge second part, 4—minor cutting edge, 5—major cutting edge of reversed point angle structure, 6—minor cutting edge of reversed point angle structure, 7—drill margin of tool, 8—axis of tool, 9—chip groove, 10—rake face, 11—ground rake face, 12—flank face, and 13—ground flank face; $b_1$—width of chisel edge, $b_2$—first part radial length of major cutting edge second part, $b_3$—second part radial length of the major cutting edge second part, $b_4$—drill margin width, $b_5$—drill margin depth, $b_6$—maximum length of reversed point angle structure, and $b_7$—width of chip groove; $D_1$—first step diameter, $D_2$—second step diameter, and $D_3$—shank clamping diameter; P—second step reversed point angle, $N_1$—major cutting edge first point angle, $N_2$—major cutting edge second point angle, $N_3$—helix angle of chip groove, $\gamma_1$—major cutting edge rake angle, $\gamma_2$—major cutting edge rake angle of reversed point angle structure, $\alpha_1$—major cutting edge primary relief angle, $\alpha_2$—major cutting edge secondary relief angle, and $\alpha_3$—major cutting edge relief angle of reversed point angle structure.

DETAILED DESCRIPTION

The technical solution in the embodiments of the present invention will be clearly and fully described below in combination with the drawings in the embodiments of the present invention. Apparently, the described embodiments are merely part of the embodiments of the present invention, not all of the embodiments.

Figure 1:
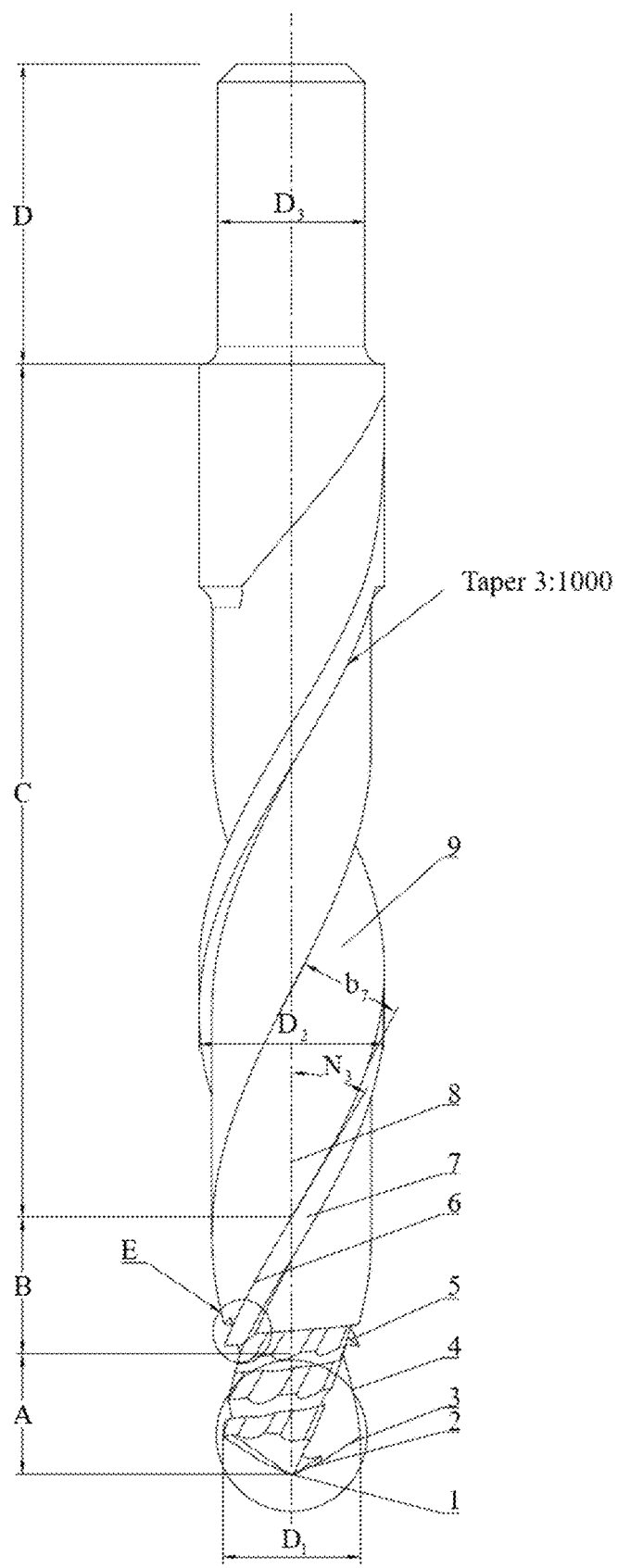
FIG. 1 is a main view of a tool for drilling aramid fiber composite material.
Figure 2:
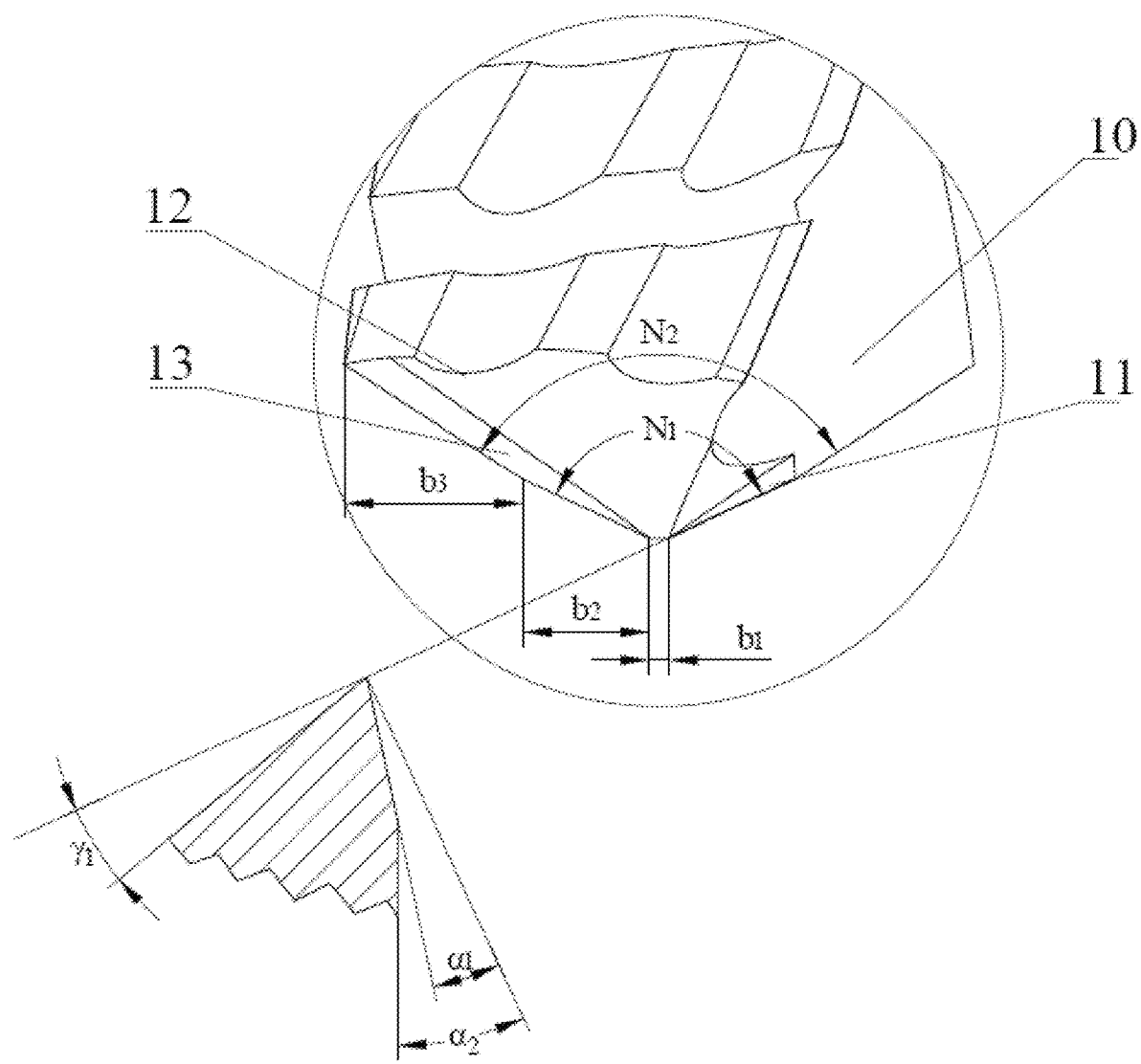
FIG. 2 is an enlarged view of a multiple point angle drill tip region A in FIG. 1.
Figure 3:
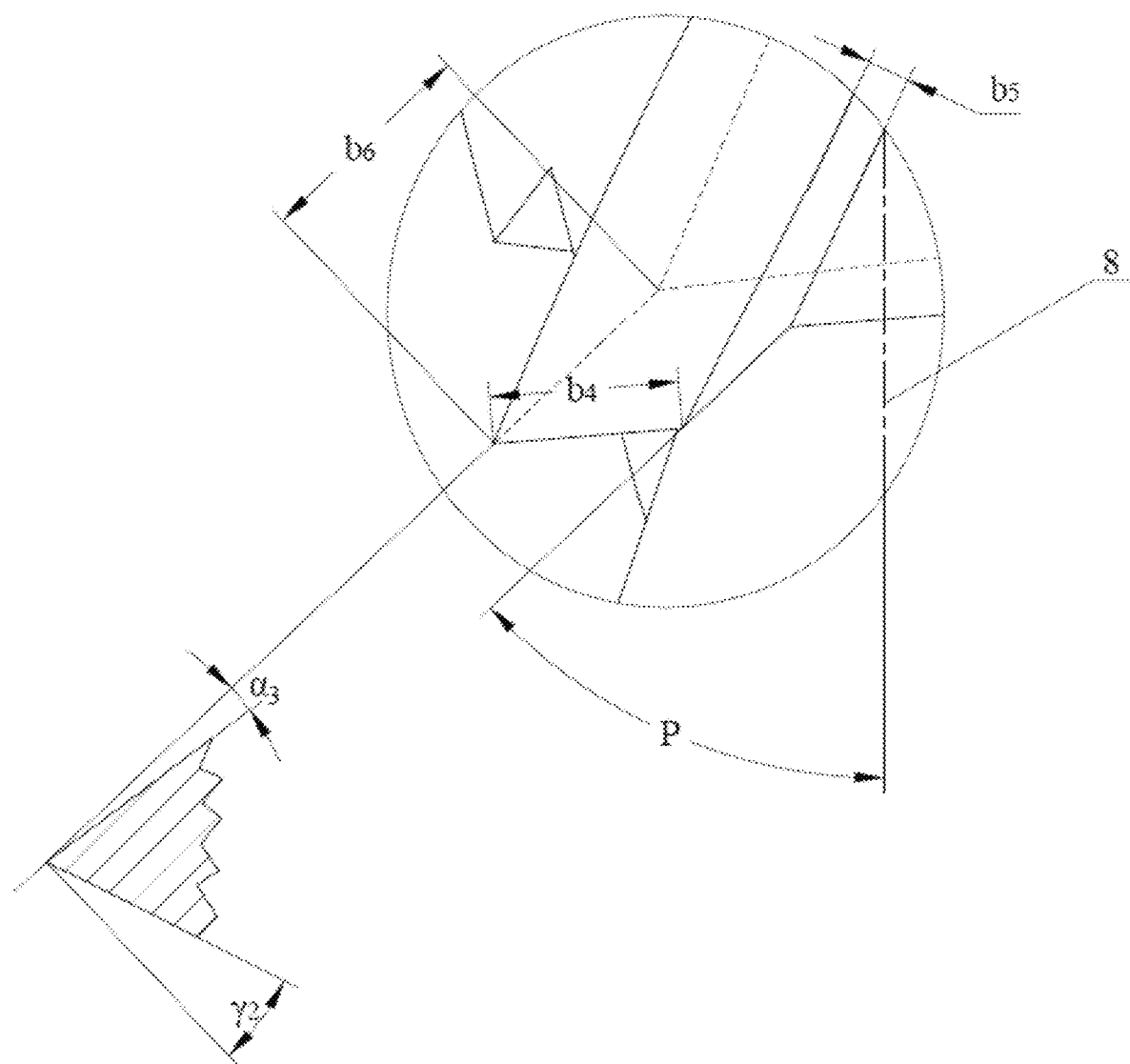
FIG. 3 is an enlarged view of a reversed point angle structure E in FIG. 1.
Figure 4:
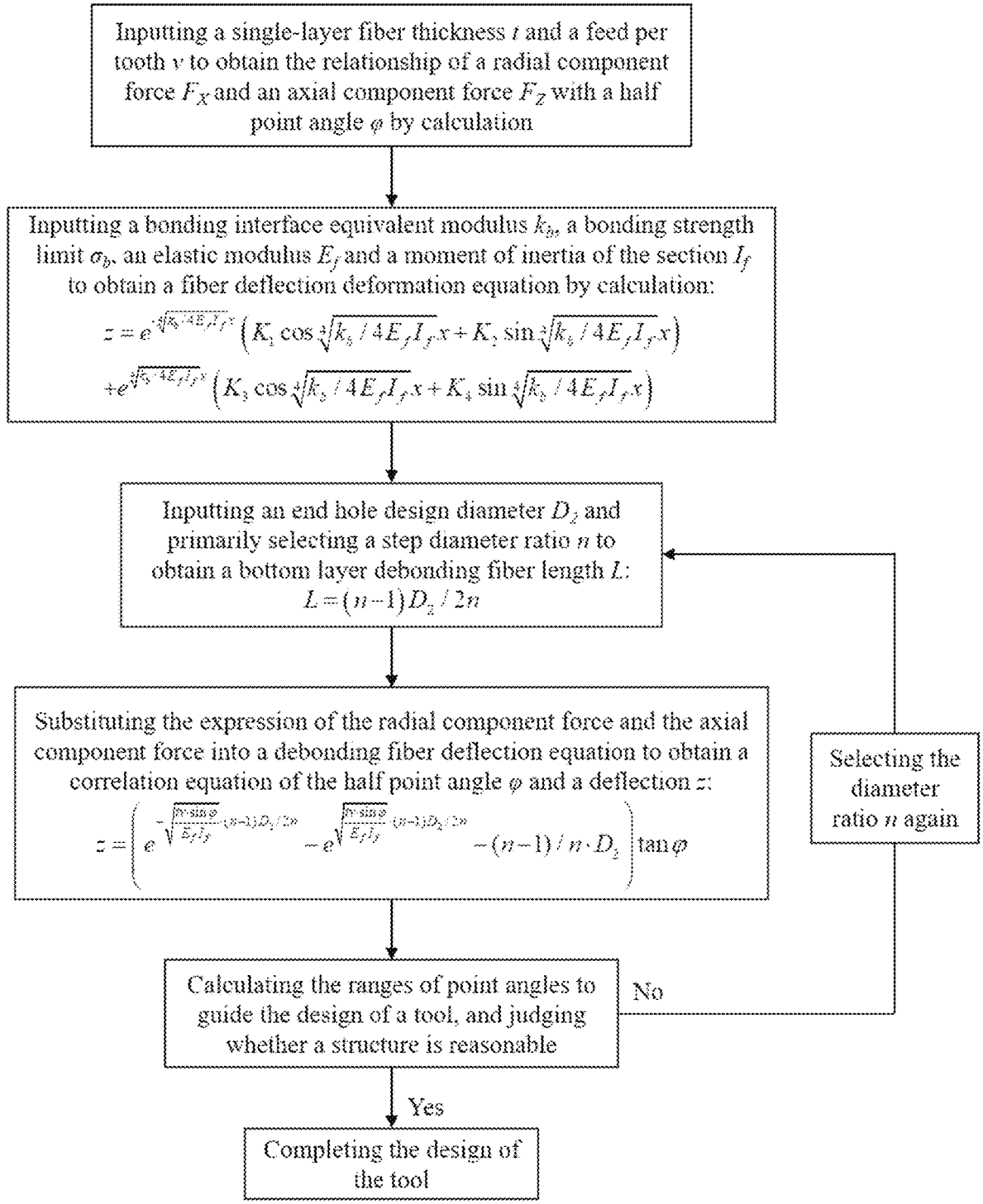
FIG. 4 is a flow chart of an optimal design method for a step diameter ratio and point angles of a tool.

As shown in FIGS. 1, 2 and 3, a tool for drilling aramid fiber composite material, which has a double step structure and consists of four parts, namely a multiple point angle drill tip region A, a reversed point angle reaming region B, a reaming region C and a shank clamping region D. A double step and multiple point angle structure can reduce the trust force. The reversed point angle reaming region B comprises a reversed point angle structure E, which can convert an axial compression effect on a composite material into an axial tension effect, so as to effectively remove fibers and reduce the processing loss. In the embodiment, an ultimate goal is to process an end hole with a diameter of 6 mm.

The multiple point angle drill tip region A is located at the utmost front end of the tool and has a diameter of $D_1$=4 mm, and X-type grinding is used to make the length of a chisel edge $b_1$=0.4 mm. When the chisel edge is shorter, the trust force can be reduced, and the delamination damage of AFRP can be reduced. A first step major cutting edge of the tool is divided into two parts which are respectively a major cutting edge first part 2 and a major cutting edge second part 3 to form a double point angle structure, the corresponding radial widths are respectively $b_2$=1.3 mm and $b_3$=1.5 mm, a major cutting edge first point angle is $N_1$=90°, and a major cutting edge second point angle is $N_2$=120°; a rake face 10 and a flank face 12 are ground to reduce the friction between the tool and the material, obtain a better heat dissipation effect, and obtain a ground rake face 11 and a ground flank face 13, wherein a major cutting edge rake angle is $\gamma_1$=20° and two major cutting edge relief angles are respectively $\alpha_1$=12° and $\alpha_2$=45°.

The reversed point angle reaming region B comprises a first step end section and a second step initial section, a drill margin of the tool at steps is ground to form a reversed point angle, i.e., the reversed point angle structure E, wherein the reversed point angle is P=−60°; the axial compression on an aramid fiber is converted into axial tension, which reduces the deformation degree of the aramid fiber, wherein a drill margin width is $b_4$=0.6 mm, a drill margin depth is $b_5$=0.2 mm, and the maximum length of the reversed point angle structure is $b_6$=1.2 mm. The reversed point angle structure E comprises a major cutting edge 5 of the reversed point angle structure and a minor cutting edge 6 of the reversed point angle structure, wherein a major cutting edge rake angle of the reversed point angle structure is $\gamma_2$=25°, and a major cutting edge relief angle of the reversed point angle structure is $\alpha_3$=15°. As a first step diameter and a second step diameter are different, a helix angle $N_3$ of a chip groove 9 and the width $b_7$ of the chip groove in the two steps shall be appropriate to meet the requirements of discharging chips smoothly, not causing chip blocking, and ensuring the rigidity of the structure in each step of the tool. Therefore, the helix angle of the chip groove is selected as $N_3$=30°, and the width of the chip groove is generally 0.8-0.9 times the diameter of the tool. A second step end hole tool diameter is $D_2$=6 mm, so the width of the chip groove is selected as $b_7$=5 mm, and in order to ensure the strength of the tool, the thickness of a drill core is selected as 2 mm.

The tool end hole diameter of the reaming region C is $D_2$=6 mm, the reaming region C has a drill margin 7 and a taper of 3:1000, and the diameter near a minor cutting edge 4 is large, so that the friction can be reduced, and the drilled and reamed holes can be further processed to improve the smoothness of hole walls. The helix angle of the chip groove 9 in the multiple point angle drill tip region A, the reversed point angle reaming region B and the reaming region C is $N_3$=34°±30′, and an escape is reserved at an end section of the reaming region C to facilitate processing by the tool.

The diameter of the shank clamping region D is $D_3$=5 mm, and a clamping length is determined according to actual clamping requirements.

When the optimal design method taking into account the step diameter ratio and point angles of the tool proposed by the present invention is adopted, the specific design steps are as follows:

Step 1: inputting the single-layer fiber thickness t=0.2 mm and the feed per tooth v=0.03 mm to obtain the relationship of a radial component force $F_X$ and an axial component force $F_Z$ with the half point angle $\varphi$ of the tool by calculation;

Step 2: inputting the bonding interface equivalent modulus $k_b$=115 GPa/m, the bonding strength limit $\sigma_b$=30 MPa, the elastic modulus $E_f$=15 GPa and the moment of inertia of the section $I_f$=$\mu m^4$ according to the criteria for judging fiber material debonding to obtain a fiber deflection deformation equation by calculation;

Step 3: inputting the end hole diameter $D_2$=6 mm and primarily selecting the step diameter ratio n=6:4 to obtain the bottom layer debonding fiber length L=1 mm and obtain a debonding fiber deflection equation by calculation;

Step 4: substituting the expression of the radial component force $F_X$ and the axial component force $F_Z$ about the half point angle $\varphi$ of the tool into the debonding fiber deflection equation to obtain an equation of the half point angle $\varphi$ and the deflection z;

Step 5: obtaining the value range of point angle P (P=−60°) according to the deflection change range, checking whether the structural strength of the tool meets design and processing requirements to complete the design of the tool in the embodiment, and using a 3D software to model and manufacture the tool.

A three-axis vertical high-speed machining center is adopted as an experimental platform, an ordinary twist drill with a diameter of 6 mm commonly used in engineering and the new tool designed in the embodiment are used as drill bits, and the drill bits are made of cemented carbide without coating and without cooling during processing. A workpiece processed is an AFRP laminate, the size of the laminate is 150×180×4 mm, the mass of aramid fibers accounts for 60% of the total mass of the laminate, and the fiber layup directions are 0° and 90° cross layup directions. With respect to cutting parameters, a spindle speed of 3000 r/min and a feed speed of 90 mm/min are used. The AFRP laminate is processed with the ordinary twist drill and the new tool designed in the embodiment, and the processing qualities are compared. It is measured that the peak value of the drilling trust force of the new tool designed in the embodiment is only 36% of that of the twist drill. The processing damages at the inlet and the outlet of the processed material are quantified and compared, which shows that the material processed by the twist drill has a burr area of 3.6 mm² and a delamination factor of 1.45, and the material processed by the new tool designed in the embodiment has a burr area of 0.4 mm² and a delamination factor of 1.06; compared with the twist drill, the burr area is reduced by more than 80%, and the delamination factor is reduced by more than 25%, i.e., the tool designed by the present invention has a good inhibition effect on the damages such as delamination and burrs at the outlet of AFRP.

A tool structure for drilling aramid fiber composite material and a design method thereof proposed by the present invention mainly relates to a step reversed point angle structure, and a design method is proposed to optimize the step diameter ratio and point angles of the tool. Compared with ordinary twist drill, the peak value of the drilling trust force of the new tool is only 36% of that of the twist drill, the burr area after processing is reduced by more than 80%, and the delamination factor is reduced by more than 25%, which can prove that the tool designed by the present invention can significantly improve the hole making quality of an AFRP component, improve the service life and safety degree, and greatly reduce the processing cost. The tool structure and design method proposed by the present invention are not limited to the structure of the embodiment, and can be changed and modified in a variety of ways. In conclusion, all changes and modifications without departing from the innovation scope of the present invention shall fall within the protection scope of the present invention.

The invention claimed is:

1. A design method of a hole making tool for aramid fiber-reinforced plastic, wherein the hole making tool for aramid fiber-reinforced plastic, comprising four regions: a multiple point angle drill tip region, a reversed point angle reaming region, a reaming region and a shank clamping region;

the multiple point angle drill tip region comprises a twist drill, and has a tool diameter of D1; the width of a chisel edge 1 is $b_1$, a major cutting edge is divided into a major cutting edge first part and a major cutting edge second part to form a double point angle structure which comprises a major cutting edge first point angle $N_1$ and a major cutting edge second point angle $N_2$, corresponding radial widths are respectively a first part radial length $b_2$ of the major cutting edge first part and a second part radial length $b_3$ of the major cutting edge second part, and a width ratio is determined according to actual processing requirements; a rake face and a flank face of the tool are ground to form a major cutting edge rake angle $\gamma_1$ and two major cutting edge relief angles which are respectively a major cutting edge primary relief angle $\alpha_1$ and a major cutting edge secondary relief angle $\alpha_2$;

the reversed point angle reaming region comprises a reversed point angle structure, a second step part of the tool is ground to obtain a reversed point angle which is P, a drill margin width is $b_4$, a drill margin depth is $b_5$, the maximum length of the reversed point angle structure is $b_6$, a major cutting edge rake angle of the reversed point angle structure is $\gamma_2$, and a major cutting edge relief angle of the reversed point angle structure is $\alpha_3$; as a first step diameter and a second step diameter are different, a helix angle $N_3$ of a chip groove and the width $b_7$ of the chip groove in the two steps shall be appropriate;

the tool diameter of the reaming region is the second step diameter $D_2$, the reaming region has a drill margin and a taper of 3:1000, and the diameter near a minor cutting edge is large;

the diameter of the shank clamping region is a shank diameter $D_3$, and a clamping length is determined according to actual clamping requirements;

the design method of the hole making tool for aramid fiber-reinforced plastic, which optimizes a step diameter ratio and point angles of the tool; first, the attribute parameters of a material to be processed, including an AFRP bonding interface equivalent modulus $k_b$, a bonding strength $\sigma_b$, an elastic modulus $E_f$ of a lower surface material, a moment of inertia of the section $I_f$ of the lower surface material, a single-layer fiber thickness t, a feed per tooth v, an end hole design diameter $D_2$, the step diameter ratio n, a bottom layer debonding fiber length L, a half point angle $\varphi$ of the tool, and a fiber deflection change z are determined; and the design method comprises the following specific steps:

step 1: inputting the single-layer fiber thickness t and the feed per tooth v to calculate the relationship of a radial component force $F_X$ and an axial component force $F_Z$ with the half point angle $\varphi$ of the tool;

step 2: inputting the bonding interface equivalent modulus $k_b$, the bonding strength limit $\sigma_b$, the elastic modulus $E_f$ and the moment of inertia of the section $I_f$ according to the criteria for judging fiber material debonding to calculate a fiber deflection deformation equation:

$$z = e^{-\sqrt[4]{k_b/4E_f I_f}\, x}\left(K_1\cos\sqrt[4]{k_b/4E_f I_f}\, x + K_2\sin\sqrt[4]{k_b/4E_f I_f}\, x\right) + \\ e^{\sqrt[4]{k_b/4E_f I_f}\, x}\left(K_3\cos\sqrt[4]{k_b/4E_f I_f}\, x + K_4\sin\sqrt[4]{k_b/4E_f I_f}\, x\right) \quad (1)$$

where $K_i$ is an integral constant, and i=1, 2, 3, 4;

step 3: inputting the end hole design diameter $D_2$ and primarily selecting the step diameter ratio n to calculate an expression of the bottom layer debonding fiber length L:

$$L = (n-1)D_2/2n \quad (2)$$

step 4: substituting the expression of the radial component force $F_X$ and the axial component force $F_Z$ about the half point angle $\varphi$ of the tool and the expression of the debonding fiber length L into the debonding fiber deflection equation to obtain an equation of the half point angle $\varphi$ and the deflection z:

$$z = \left(e^{-\sqrt{\frac{tv\cdot\sin\phi}{E_f I_f}}\cdot(n-1)D_2/2n} - e^{\sqrt{\frac{tv\cdot\sin\phi}{E_f I_f}}\cdot(n-1)D_2/2n} - (n-1)/n\cdot D_2\right)\tan\varphi \quad (3)$$

step 5: determining the deflection change range of the material according to processing quality requirements, calculating the corresponding ranges of the point angles according to equation (3) to guide the design of the tool, and judging and checking whether the structure of the tool is reasonable; if not reasonable, going back to step 3 and selecting the step diameter ratio n again.

* * * * *